J. B. DALTON.
APPARATUS FOR MAKING COFFEE.
APPLICATION FILED NOV. 4, 1916.
1,219,442.
Patented Mar. 20, 1917.
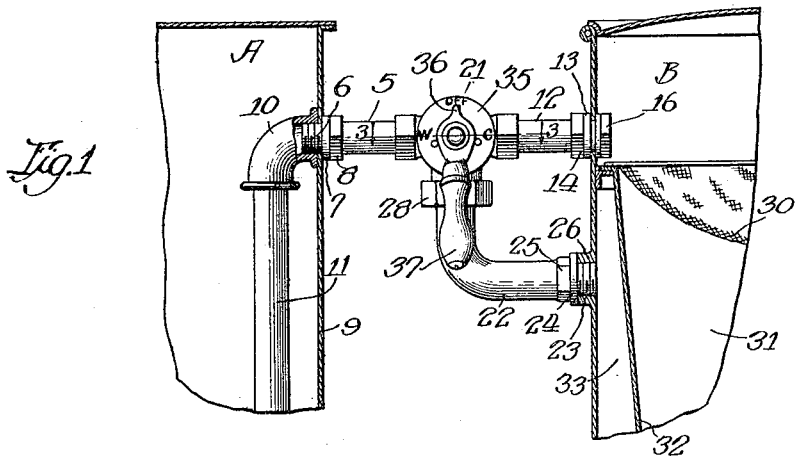
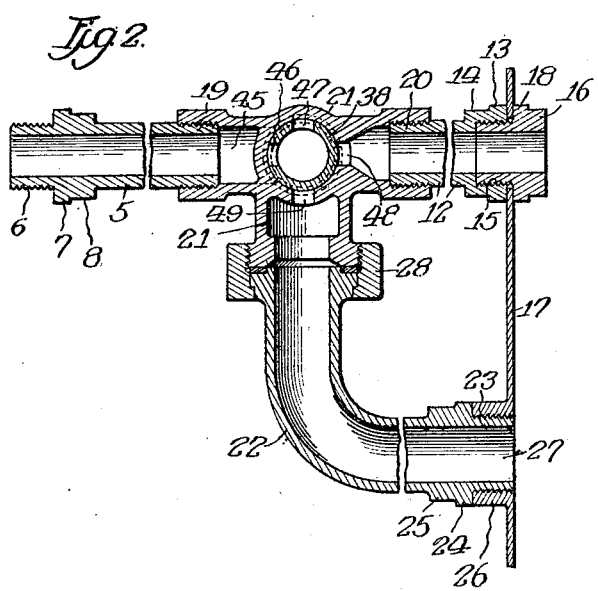
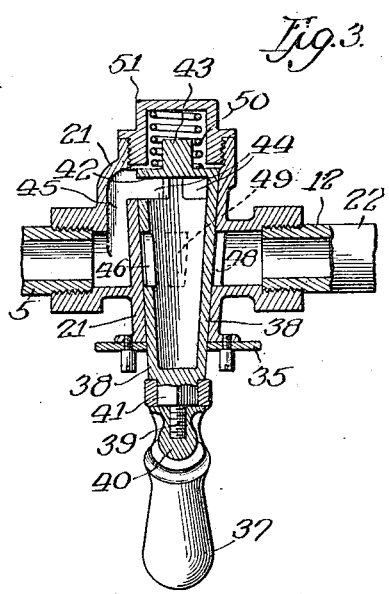
Witnesses:
Inventor.
Joseph B. Dalton

UNITED STATES PATENT OFFICE.

JOSEPH B. DALTON, OF CHICAGO, ILLINOIS.

APPARATUS FOR MAKING COFFEE.

1,219,442.             Specification of Letters Patent.       Patented Mar. 20, 1917.

Application filed November 4, 1916. Serial No. 129,444.

*To all whom it may concern:*

Be it known that I, JOSEPH B. DALTON, a citizen of the United States, and resident of the city of Chicago, in the county of Cook and State of Illinois, have invented certain new and useful Improvements in Apparatus for Making Coffee, of which the following is a specification.

My invention relates to apparatus for making coffee and more particularly to the means therein for controlling the flow of hot water from one of the two tanks comprising the unit to the other thereof.

The term "coffee" as used herein is to be understood as meaning the table beverage formed by treating ground or pulverized roasted coffee beans with hot water, and which beverage is ordinarily simply called "coffee."

Apparatus of the general character herein specified comprises a water-heating tank and what I will denominate a coffee-making tank, with pipe and valve connections between the two. The water-heating tank may embody coils for heating the water by steam, or may have other water-heating means. The coffee-making tank contains a percolator including a receptacle spaced from the side walls of the tank for containing the coffee, the space around this receptacle being provided for the accommodation of hot water for keeping the coffee hot until it is drawn for use. Such tanks are well known and are sufficiently shown fragmentarily in the drawings. It is old also to provide pipes and valves between the two tanks whereby hot water may be discharged both into the percolator and into the hot water space about the same.

Heretofore, however, these pipe and valve connections have been such as to entail notable expense in their construction, notable difficulty in assembling the same with the tanks, and also calling for more labor and greater care on the part of the person handling the device than I find to be necessary, the prior suggestions along these lines giving rise in practice to frequent mistakes in the operation of the several valves heretofore provided, confusion, mishap and loss of time.

The principal objects of the present improvements are to overcome the objections just pointed out, and to provide a simple form of pipe and valve connection, of relative cheap construction, easy to assemble and take apart.

In the accompanying drawings, which form a part of this specification, I have illustrated a preferred form of these improvements, Figure 1 being a face view of the valve and pipe connections, the tanks being shown fragmentarily and in section; Fig. 2 being an enlarged medial vertical section through most of the parts of Fig. 1; and Fig. 3 being a similarly enlarged horizontal section through the valve and connected pipes, as on the line 2—2 of Fig. 1.

In these drawings "A" designates the water-heating tank while the coffee-making tank is indicated as "B". The pipe connection 5 is threaded exteriorly at 6 and is provided with a collar 7 part of which, as at 8, is made hexagonal or square for engagement by a wrench. The part 6 passes through an opening in the wall 9 of the tank "A" and is screwed into the elbow 10 on the pipe 11 reaching almost to the bottom of the tank.

The pipe connection 12 has a collar 13 having a portion as 14 similarly shaped to be held by a wrench; but this connection is threaded interiorly as at 15 and a nipple 16, also formed to be held by a wrench, is threaded into the connection 12, thus binding the wall 17 of the tank "B" between the collars 13 and 18. The other ends 19 and 20 of these pipes are secured in any approved manner to the valve casing 21, as by threading in the manner shown.

The pipe connection 22 has its one end exteriorly threaded as at 23 and is provided with a collar 24 formed for wrench engagement as at 25. A nut 26 is secured, as by brazing or soldering, to the wall 17 about the hole 27, and the connection 22 is threaded into the nut 26. The other end of the connection 22 is provided with a union joint 28 of any approved construction and so formed to coact with the valve casing 21 that after the pipe 22 is threaded into the nut 26 it may be secured to the valve casing without further turning of the pipe 22. The union illustrated is of a well known form.

According to this construction the assembling of these parts with the two tanks is exceedingly simple. The connection 22 being disjointed at the union 28 and the nipple 16 being separated from the pipe 12, the threaded end 6 is first screwed into the elbow 10. The nipple 16 may then be threaded into the pipe 12 as shown in the drawings, the tank "B" having a removable cover whereby free access may be had to the interior thereof. It is then only necessary to screw the connection 22 into the nut 26 and by means of the union 28 connect the pipe 22 to the valve casing.

The valve shown is formed to discharge hot water from the pipe 5 into the pipe 12 or into the pipe 22, or to cut off the flow from the pipe 5. When hot water flows through the pipe 12 it is discharged into the percolator bag 30 adapted to contain ground or pulverized coffee beans, and the desired beverage issues into the percolator tank 31 defined by side walls as 32 and a bottom wall (not shown). A pipe with an outside faucet (not shown) enables the coffee to be withdrawn for use. When the hot water is discharged through the pipe 22 it issues into the space 33 surrounding the percolator for keeping the coffee hot. Inasmuch as additional coffee is made from time to time and the water in the space 33 is frequently changed, and as the apparatus is also frequently cleaned and flushed, the valve for controlling the flow into the tank "B" is frequently operated, and the provision of a single valve for this purpose instead of a plurality of valves as heretofore renders the operation notably simple and easy and free from mishaps due to confusion of valves. In the valve shown the letter "W" indicates water, the letter "C" coffee and the word "Off" indicates that the valve is closed. By moving the pointer 36 by means of the handle 37 to "W" water flows into the space 33 and by moving it to "C" water is discharged into the percolator for making coffee.

The preferred form of valve comprises the hollow tapering plug 38 fitted valve-fashion into the casing 21 and provided with a threaded stem 39 and nut 40 for maintaining the handle and pointer rigid with the plug 38 on the squared projection 41. The larger end of the plug 38 has a transverse wall 42 preferably having a squared projection 43 by which the plug may be turned for adjustments or by which it may be seized and withdrawn. It is also provided with a plurality of openings or intake ports, as 44, whereby water coming from the pipe 5 and passing through the port 45 may enter the interior of the plug. The plug has two discharge ports 46 and 47 and the casing 21 has two corresponding ports 48 and 49, the ports being so arranged that by moving the handle 37 as hereinabove described the flow of hot water will be controlled also as mentioned. An expansion coil spring 50 is positioned between the cap 51 and the end wall 42 of the plug, the cap 51 being threaded into an opening in the casing 21 as shown. The plug 38 is thus maintained in tight-fitting relation to the casing wall surrounding the same.

It will be noted that the valve is such that in operating the same so as to discharge alternately through the arms 12 and 22 from the stem 5 of the substantially Y-shaped pipe connection the valve is always fully closed between one flow and the other. According to these improvements it is only necessary for the operator to swing the valve handle in an easy and simple manner to secure any desired flow, and a flow free from any other flow whatever. Furthermore, the dial and pointer are a constant indication of the operative relation of the valve parts, an important feature where, as is frequently the case, numerous persons have to do with the apparatus, where the flow is often started and the apparatus then temporarily abandoned, either carelessly or while other duties are being performed, where overflows frequently occur and it is important that the first person arriving at the tank should instantly comprehend the state of the valve and operate it quickly, and where waitresses and others substantially inexperienced in mechanical devices are frequently called upon to operate the valve. Thus in addition to a very marked saving of cost in construction and installation it is apparent that exceedingly important advantages and results are attained in the operation of the apparatus illustrated and described.

In practice I make the valve and pipe connections of brass according to methods well understood in the mechanic arts, but other metals may be employed.

I claim:

1. In combination, a water-heating tank, a coffee-making tank having a percolator therein having its body spaced from the tank walls, a substantially Y-shaped pipe connection between said tanks, a valve at the junction of the stem and arms of said pipe connection, the stem of said connection being secured to the water-heating tank whereby water may flow therethrough to said valve, one of the arms of said connection being secured to said coffee-making tank whereby water may be discharged therefrom into said percolator, the other arm of said connection being secured to said coffee making tank whereby water may be discharged therefrom into the space about said percolator, means for operating said valve, and means for indicating the relative position of valve parts, said valve being such that by operating the same water may flow alternately through either of said connection arms and whereby the flow may be cut off from each thereof.

2. In combination a water-heating tank, a coffee-making tank including a percolator within the tank and spaced from the walls thereof providing a space for hot water, a substantially Y-shaped pipe connection having the stem thereof in communication with the interior of said water-heating tank and the two arms thereof in communication with the interior of said coffee-making tank whereby one of said arms is adapted to discharge into said percolator and the other into the space about the same, a unitary valve at the junction of said stem and arms adapted to discharge water from said stem into one of said arms and then into the other thereof and means for operating said valve, said valve being such that the flow is cut off from one of said arms when the valve is operated to cause a flow through the other thereof.

3. A pipe connection for two tanks of coffee-making apparatus of the character described, comprising in combination a pipe formed to be screwed into the water-heating tank from the outside thereof, a two-way valve secured to said pipe, two branch pipes extending from said valve, one of said branch pipes having means for securing the same to a wall of the coffee-making tank by a threaded member operable from the inside of said coffee-making tank, the other branch pipe having means for screwing the same into a wall of the coffee-making tank from the outside thereof, a union connection between said last mentioned branch pipe and said valve, said valve being formed to discharge water into said two branch pipes alternately and to cut off the flow from each thereof, and means for operating said valve.

JOSEPH B. DALTON.

Copies of this patent may be obtained for five cents each, by addressing the "Commissioner of Patents, Washington, D. C."